Aug. 3, 1954  B. E. R. LÖFQVIST  2,685,462
ROCK DRILL
Filed June 14, 1951
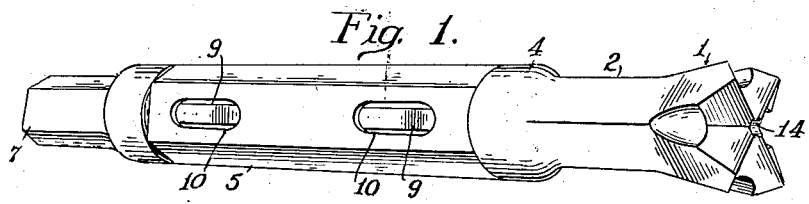
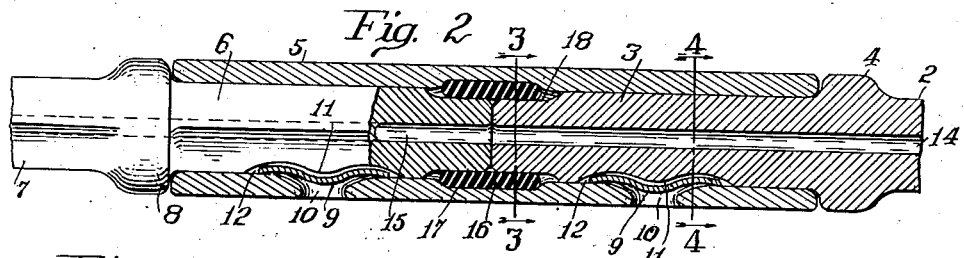
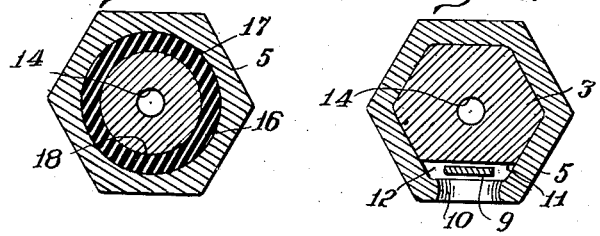
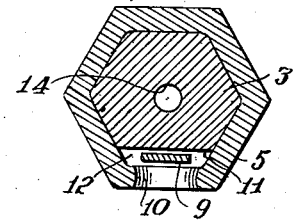
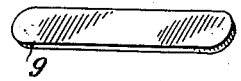
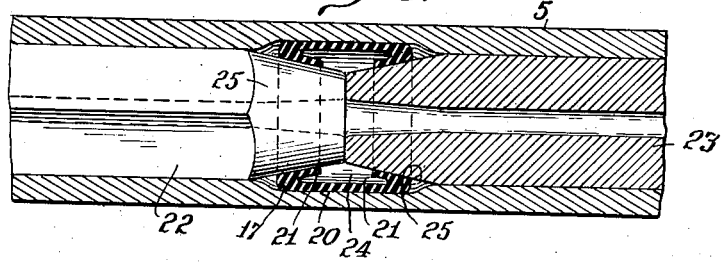
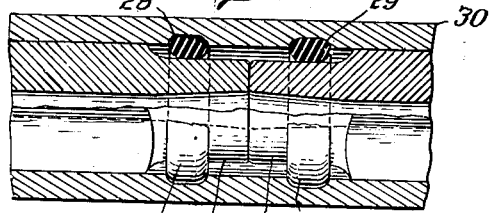
INVENTOR:
Bengt Erik Ragnwald Löfqvist,
BY: Pierce, Scheffler & Parker,
ATTORNEYS Patented Aug. 3, 1954

2,685,462

UNITED STATES PATENT OFFICE 2,685,462

ROCK DRILL

Bengt Erik Ragnwald Löfqvist, Sandviken, Sweden, assignor to Sandvikens Jernverks Aktiebolag, Sandviken, Sweden, a corporation of Sweden Application June 14, 1951, Serial No. 231,513

Claims priority, application Sweden June 28, 1950

1 Claim. (Cl. 285—196)

The present invention relates to percussively driven and rotated rock drills particularly adapted for deep drilling operations in which the drill stem and bit are separably connected and provided with an axial passage for feed of a flushing liquid to the bit in order to wash the cuttings out of the bore hole. More particularly the invention relates to rock drills in which the sections of the drill stem are detachably interconnected by a coupling permitting a limited amount of play between adjacent rod sections in the longitudinal direction.

The use of a non-rigid coupling between the sections of the drill rod and between the rod end and the drill bit instead of a rigid connection such as a threaded coupling reduces fatigue stresses and almost completely eliminates premature failure of the drill at the joints. However, the loose connection coupling has the inherent disadvantage that leakage of the flushing liquid at the joints, particularly in a long string of drill rods, results in the delivery of an insufficient stream of liquid to the drill bit to properly perform the function of flushing out the bore hole.

Various attempts have been made to overcome this difficulty such as by inserting connecting tubes into the axial passages to bridge the joints between the rod ends, however these measures have not resulted in any substantial decrease in loss of fluid.

The primary object of the invention is to provide an improved rock drill in which the rod ends are joined in abutting relation by a coupling sleeve which receives the ends of adjacent rods, providing the rotative connection between them and having one or more sealing rings within the bore thereof of resilient or elastic material for sealing engagement with the ends of the rods engaged in the coupling.

More particularly the invention comprises a coupling sleeve having a non-circular bore for receiving rod ends of similar cross section, the bore of the coupling sleeve having an internal groove or grooves within which are seated a resilient sealing ring or rings positioned to have sealing engagement with the ends of the rods inserted into the opposite ends of the coupling sleeves, the rod ends at the ends thereof being of cylindrical or conical form for better sealing engagement with the sealing means.

Other objects and advantages of the invention and the details of construction thereof will appear from the following detailed description of the preferred embodiments thereof illustrated in the accompanying drawings.

In the drawings:

Fig. 1 is a perspective view of an end of an assembled rock drill embodying the invention;

Fig. 2 is a longitudinal section through a coupling embodying the invention between two drill rod sections;

Fig. 3 is a cross section on the line 3—3 of Fig. 2;

Fig. 4 is a cross section on the line 4—4 of Fig. 2;

Fig. 5 is a perspective view of a removable key for securing the parts from longitudinal separation;

Fig. 6 is a fragmentary longitudinal section through a modified form of the invention, and Fig. 7 is a fragmentary longitudinal section through another modification thereof.

Referring now more particularly to the drawings, 1 denotes a drill bit having a shank 2 formed with a hexagonal end portion 3 and a shoulder 4 spaced from the end. A coupling sleeve 5 having a hexagonal bore complementary in size to the shank end 3 is telescoped onto the end, the sleeve being twice as long as the end 3 so that with the shoulder 4 acting as a stop for the end of the sleeve, the extremity of the shank end 3 extends to a point midway of the ends of the sleeve.

The other end of the sleeve 5 receives the complementary hexagonal end 6 of a drill rod section 7 which is also provided with a shoulder 8, similar to the shoulder 4 and spaced from the extremity of the end 6. With the parts assembled, the ends of the portions 3 and 6 are in abutting contact for transmission of percussive forces, rotative forces being transmitted from section to section and to the drill bit through the coupling sleeve.

The parts are held in assembled relation against longitudinal separation by means of flat spring metal keys 9 which may be doubled and inserted through slots 10 in the side of the sleeve 5 to occupy specially shaped recesses 11 in the respective ends 3 and 6. The slots 10 are shorter than the keys 9 and the recesses 11 have end portions 12 of diminishing depth so that as the keys 9 attempt to spring back into shape the ends thereof jam between the wall of the sleeve and the tapering bottom of the end portions 12 of the recess thereby acting as wedges and effectively preventing separation of the parts until the keys are removed. This may be done with a simple tool such as a screw driver or other blade so that a very efficient quick detachable connection is provided.

Both the drill bit 3 and the rod sections 7 are provided with axial bores 14 and 15, respectively for the supply of flushing liquid to wash the cuttings from the bottom of the bore hole. Leakage of liquid at the abutting ends of the sections and out the ends of the coupling sleeve is prevented by internal sealing means in the form of a resilient sealing ring or sleeve 16, of rubber, plastic, or leather seated in an internal annular groove 17 in the coupling sleeve 5 midway of the ends thereof so as to have sealing engagement with the periphery of both of the abutting ends 3 and 6. The ring 16 is of sufficient wall thickness to project into the bore of the sleeve for tight engagement with the ends 3 and 6 and in order to insure a better seal the ends 3 and 6 are formed with cylindrical terminal portions 18 and 19, respectively, dimensioned to have a good tight fit when forced into the ends of the sealing ring. The sealing ring or sleeve 16 is held from axial movement by the ends of the annular groove 17.

It will thus be observed that a very satisfactory drill structure is provided in which the drill stem sections and drill bit may be quickly coupled and uncoupled and that a reliable and effective seal is automatically provided when the coupling is made to prevent leakage of the drilling fluid at the joints.

In the modified form of the invention illustrated in Fig. 6, the sealing ring 20 is formed with inturned ends 21 which with the abutting ends 22 and 23 of the drill rod sections define an annular space 24 for fluid pressure to build up and force the inturned ends into tighter sealing engagement with the rod ends. In this form of the invention the extremities 25 of the rod ends are turned or otherwise formed to provide tapered frusto-conical ends for better sealing engagement with the inturned lips 21.

In the modification illustrated in Fig. 7 separate sealing rings 26 and 27 are provided in individual annular grooves 28 and 29, respectively, in spaced relation on opposite sides of the mid point between the ends of the coupling sleeve 30 so that the cylindrical end 31 of one rod section engages the ring 26 and the cylindrical end 32 of the abutting rod section engages the other ring 27.

While the invention has been shown as having the rod ends and bore of the sleeve hexagonal in cross section, it will be understood that these may be of any other suitable non-circular form, such as square, oval, rectangular or cruciform or other multisided figure the essential requirement being that the mating parts shall be locked against relative rotation when coupled so that the proper rotative force may be transmitted to the drill bit. It will also be understood that where the specification speaks of the end of the drill bit or end of a rod section, these may be used interchangeably since the invention is equally well adapted for the connection of a drill bit to a rod end as it is for connecting a plurality of rods together for forming the drill stem with the connections in each instance sealed against leakage of flushing liquid.

I claim:

A sectional rock drill comprising two sections having similar, relatively extensive end surfaces substantially in contact with each other throughout their entire areas, said sections having alined axial bores therethrough, the adjacent end portions of said sections being cylindrical and the portions of said sections adjacent said end portions being non-cylindrical, a unitary coupling sleeve surrounding said cylindrical and non-cylindrical portions of said sections, said sleeve having one bore portion which is cylindrical surrounding said cylindrical end portions of said sections and two spaced apart non-cylindrical bore portions surrounding said non-cylindrical portions of said sections, the cross-sectional shapes of said non-cylindrical portions of said sleeve being geometrically similar to the cross-sectional shapes of said non-cylindrical portions of said sections and of such relative size as to prevent relative turning movement of said sections, the cylindrical portion of said sleeve being of larger diameter than the cylindrical portions of said sections, a resilient annular sealing ring having smooth cylindrical outer and inner surfaces occupying the space between the cylindrical portions of said sections and the cylindrical portion of said sleeve and smoothly contacting the surfaces thereof, said ring having an axial length substantially equal to the axial length of the cylindrical portion of said sleeve, and means for releasably locking said sections and said sleeve against axial relative movement.

References Cited in the file of this patent

UNITED STATES PATENTS

| Number | Name | Date |
|---|---|---|
| 548,191 | Griscom | Oct. 22, 1895 |
| 1,296,954 | Haus | Mar. 11, 1919 |
| 2,182,797 | Dillon | Dec. 12, 1939 |
| 2,209,235 | Nathan | July 23, 1940 |

FOREIGN PATENTS

| Number | Country | Date |
|---|---|---|
| 449,612 | Great Britain | June 29, 1936 |